United States Patent
Kaizu et al.

(10) Patent No.: US 7,203,025 B2
(45) Date of Patent: Apr. 10, 2007

(54) MAGNETIC RECORDING MEDIUM, MAGNETIC HEAD, AND MAGNETIC RECORDING AND REPRODUCING DEVICE

(75) Inventors: Akimasa Kaizu, Tokyo (JP); Yoshikazu Soeno, Tokyo (JP)

(73) Assignee: TDK Corporation, Tokyo (JP)

( * ) Notice: Subject to any disclaimer, the term of this patent is extended or adjusted under 35 U.S.C. 154(b) by 37 days.

(21) Appl. No.: 11/107,926

(22) Filed: Apr. 18, 2005

(65) Prior Publication Data

US 2005/0254157 A1 Nov. 17, 2005

(30) Foreign Application Priority Data

May 13, 2004 (JP) ............................. 2004-144047

(51) Int. Cl.
*G11B 5/596* (2006.01)
(52) U.S. Cl. .................................. 360/77.08
(58) Field of Classification Search ............. 360/77.08, 360/75, 77.02, 77.05, 78.04; 204/192.2; 428/694 TS
See application file for complete search history.

(56) References Cited

U.S. PATENT DOCUMENTS 6,872,285 B2 * 3/2005 Furukawa et al. ........ 204/192.2

2002/0127436 A1 * 9/2002 Shibamoto et al. .... 428/694 TS

FOREIGN PATENT DOCUMENTS

| JP | A-05-012628 | 1/1993 |
| JP | A-07-129953 | 5/1995 |
| JP | A-2003-248902 | 9/2003 |

* cited by examiner

*Primary Examiner*—Fred F. Tzeng
(74) *Attorney, Agent, or Firm*—Oliff & Berridge, PLC (57) ABSTRACT

The magnetic recording and reproducing device has a magnetic recording medium, a recording head for writing magnetic data on the magnetic recording medium, and a reproducing head for reading magnetic data from the magnetic recording medium. In the magnetic recording medium, each track is formed by a convex portion with a predetermined track width, and a plurality of the tracks are arranged in parallel at intervals of a predetermined track gap. The relationship represented by the following formula (I) is satisfied:

$$\{Tw+(2\times Tg)\}/1.2 \geq MWw \qquad (I)$$

wherein Tw represents the track width, Tg represents the track gap, and MWw represents the magnetic write width of the recording head.

19 Claims, 8 Drawing Sheets

Position of reproducing head
in track width direction

Position of reproducing head
in track width direction

MAGNETIC RECORDING MEDIUM, MAGNETIC HEAD, AND MAGNETIC RECORDING AND REPRODUCING DEVICE

BACKGROUND OF THE INVENTION

1. Field of the Invention

The present invention relates to a magnetic recording medium, in which a recording layer is formed in a concavo-convex pattern, and convex portions of the concavo-convex pattern form tracks for recording magnetic data. The present invention also relates to a magnetic head for this magnetic recording medium, and a magnetic recording and reproducing device provided with the magnetic recording medium and the magnetic head.

2. Description of the Related Art

Conventionally, a magnetic recording medium such as a hard disc has been significantly improved in areal density because of improvement such as fining magnetic particles forming a recording layer, material changes, and increased precision in the processing of heads. Also a perpendicular recording type of magnetic recording medium with higher areal density is being in practical use. In the perpendicular recording type of magnetic recording medium, a recording layer is oriented so as to have magnetic anisotropy in a direction perpendicular to surface, and furthermore a soft magnetic layer is formed under the recording layer to strengthen a recording magnetic field. Further improvement in the areal density is expected in the future.

However, problems such as limitations in the processing of the head, the erroneous recording of information on adjacent tracks to track to be recorded due to the spread of a magnetic field, and crosstalk have become evident, so that the improvements in the areal density by a conventional improvement method has reached their limitations. Thus, a magnetic recording medium such as a discrete track medium and a patterned medium has been proposed as a candidate for a magnetic recording medium which can realize the further improvement in the areal density (see, for example, Japanese Patent Laid-Open Publication No. Hei 7-129953). In such a magnetic recording medium, a recording layer is formed in a concavo-convex pattern, and convex portions of the concavo-convex pattern form tracks for recording magnetic data.

In other words, recording the magnetic data on the tracks formed as the convex portions makes it possible to restrain the recording of information on an adjacent track, crosstalk between adjacent tracks, and the like.

The recording of information on the adjacent track and the crosstalk, however, are affected by the concrete structure of a magnetic recording medium such as the shape of tracks, and also affected by the structure of a magnetic head. Thus, it is impossible to certainly write magnetic data on only a track to be written, and to certainly read magnetic data from a track to be read, if the tracks are merely formed by the convex portions.

SUMMARY OF THE INVENTION

In view of the foregoing problems, various exemplary embodiments of this invention provide a magnetic recording medium in which convex portions of a concavo-convex pattern form tracks of a recording layer, in order to certainly write magnetic data on only a track to be written, and certainly read magnetic data from a track to be read. Various exemplary embodiments of this invention also provide a magnetic head for this magnetic recording medium, and a magnetic recording and reproducing device with the magnetic recording medium and the magnetic head.

In course of reaching the present invention, the inventors produced various simulation models with different sizes, shapes of tracks and the like, and performed simulations to determine various characteristics, in a magnetic recording and reproducing device with a magnetic recording medium in which convex portions of a concavo-convex pattern form tracks of a recording layer. The inventors found out that restraining the relationship of the magnetic write width MWw of a recording head with respect to the track width Tw and track gap Tg of the magnetic recording medium made it possible to prevent magnetic data from being written on a track adjacent to a track to be written wrongly in the above-described magnetic recording and reproducing device with such a magnetic recording medium.

The inventors also found out that restraining the relationship of the magnetic write width MWw of the recording head with respect to the track width Tw of the magnetic recording medium made it possible to write magnetic data so as to obtain a sufficient S/N ratio of a reproduction signal.

Furthermore, the inventors found out that restraining the relationship of the magnetic read width MRw of the reproducing head with respect to the track width Tw and track gap Tg of the magnetic recording medium made it possible to prevent magnetic data from being read from a track adjacent to a track to be read wrongly.

Accordingly, various exemplary embodiments of the present invention provide a magnetic recording and reproducing device comprising:

a magnetic recording medium having a recording layer formed in a concavo-convex pattern, convex portions of the concavo-convex pattern forming tracks with a predetermined track width for recording magnetic data, a plurality of the tracks being arranged in parallel at intervals of a predetermined track gap in a direction of the track width;

a recording head for writing magnetic data on the magnetic recording medium; and a reproducing head for reading magnetic data from the magnetic recording medium, wherein a relationship represented by the following formula (I) is satisfied:

$$\{Tw+(2\times Tg)\}/1.2 \geq MWw \qquad (I)$$

wherein Tw represents the track width of the magnetic recording medium, Tg represents the track gap of the magnetic recording medium, and MWw represents a magnetic write width of the recording head.

Moreover, various exemplary embodiments of the present invention provide a magnetic recording medium provided in a magnetic recording and reproducing device, the magnetic recording and reproducing device having a recording head for writing magnetic data and a reproducing head for reading magnetic data, the magnetic recording medium comprising:

a recording layer formed in a concavo-convex pattern, convex portions of the concavo-convex pattern forming tracks with a predetermined track width for recording magnetic data, a plurality of the tracks being arranged in parallel at intervals of a predetermined track gap in a direction of the track width, wherein a relationship represented by the following formula (I) is satisfied:

$$\{Tw+(2\times Tg)\}/1.2 \geq MWw \qquad (I)$$

wherein Tw represents the track width, Tg represents the track gap, and MWw represents a magnetic write width of the recording head.

Furthermore, various exemplary embodiments of the present invention provide a magnetic head provided in a magnetic recording and reproducing device having a magnetic recording medium, the magnetic recording medium having a recording layer formed in a concavo-convex pattern, convex portions of the concavo-convex pattern forming tracks with a predetermined track width for recording magnetic data, a plurality of the tracks being arranged in parallel at intervals of a predetermined track gap in a direction of the track width, the magnetic head comprising:

a recording head for writing magnetic data on the magnetic recording medium; and a reproducing head for reading magnetic data from the magnetic recording medium, wherein a relationship represented by the following formula (I) is satisfied:

$$\{Tw+(2\times Tg)\}/1.2 \geq MWw \qquad (I)$$

wherein Tw represents the track width of the magnetic recording medium, Tg represents the track gap of the magnetic recording medium, and MWw represents a magnetic write width of the recording head.

Various exemplary embodiments of the present invention provide a magnetic head provided in a magnetic recording and reproducing device having a magnetic recording medium, the magnetic recording medium having a recording layer formed in a concavo-convex pattern, convex portions of the concavo-convex pattern forming tracks with a predetermined track width for recording magnetic data, a plurality of the tracks being arranged in parallel at intervals of a predetermined track gap in the direction of the track width, the magnetic head comprising:

a recording head for writing magnetic data on the magnetic recording medium; and a reproducing head for reading magnetic data from the magnetic recording medium, wherein a magnetic read width of the reproducing head is larger than a magnetic write width of the recording head.

A "recording layer formed in a concavo-convex pattern" is used herein as the meanings including a case where a recording layer is divided into a number of recording elements, a case where a recording layer is partly divided so as to continue a part thereof, a case where a recording layer is formed continuously to a part over a substrate like a recording layer in a spiral shape, and a case where both of a convex portion and a concave portion are formed in a continuous recording layer.

The term "track width" is used herein to mean the width of a convex portion of the concavo-convex pattern of the recording layer in a top face opposite to a substrate of a magnetic recording medium.

The term "track gap" is used herein to mean the distance between adjacent convex portions in the direction of the track width, in the top face opposite to the substrate of the magnetic recording medium in the convex portions of the concavo-convex pattern of the recording layer.

Figure 11:
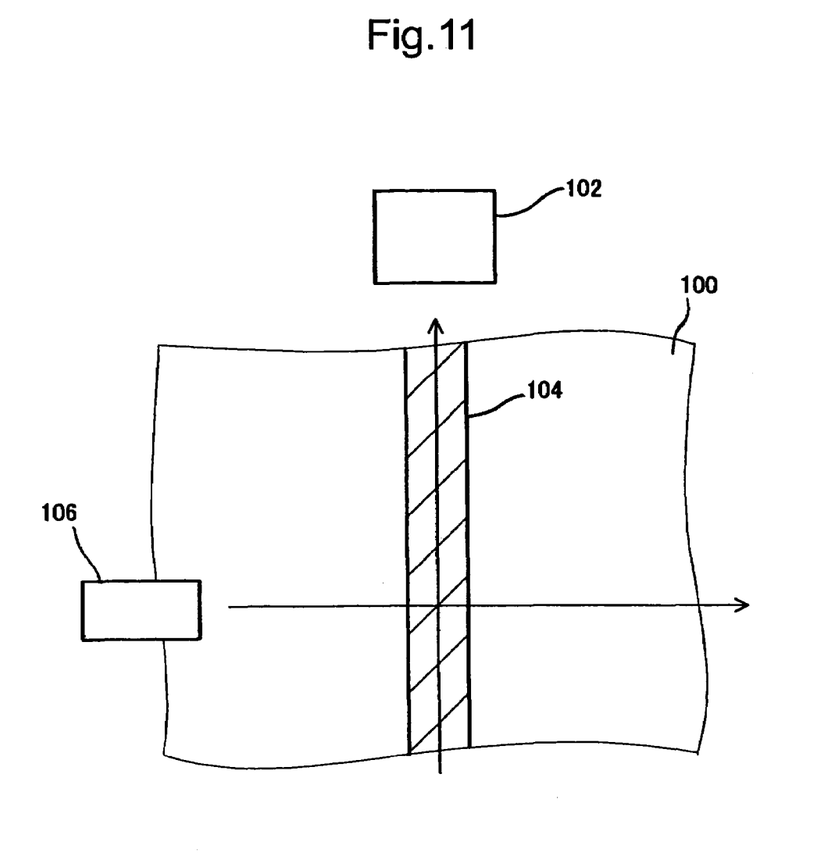
FIG. 11 is a plan view which shows a method for measuring the magnetic write width of the magnetic recording and reproducing device.
Figure 12:
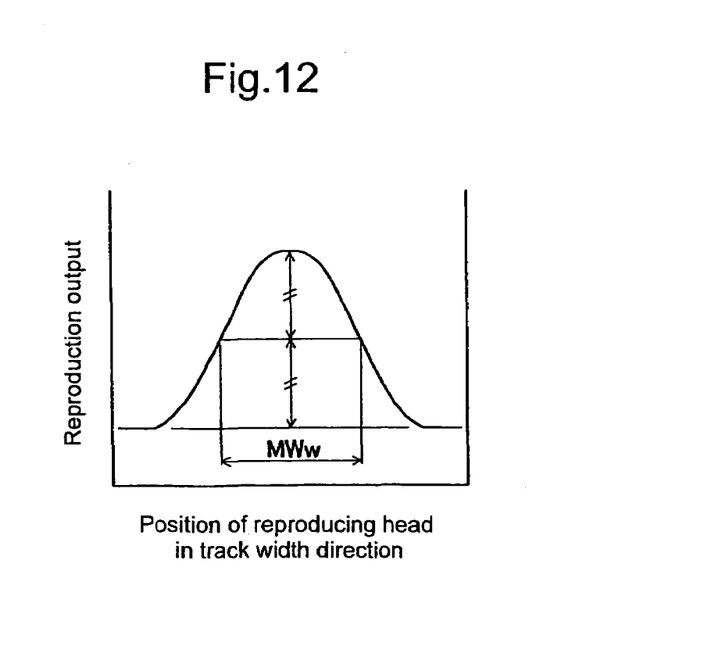
FIG. 12 is a graph showing the relationship between the position of a reproducing head in the direction of a track width and the output of a reproduction signal in the measurement of the magnetic write width.

The term "magnetic write width MWw of a recording head" is used herein to mean a value measured by the following method. Namely, a magnetic recording medium which has a flat film-shaped continuous recording layer is first prepared for measurement. The material and thickness of the continuous recording layer are the same as those of a recording layer with a concavo-convex pattern in an original magnetic recording medium provided in a magnetic recording and reproducing device together with a recording head. The structure of the magnetic recording medium except for the recording layer is the same as that of the original magnetic recording medium. A recording head 102 applies a recording magnetic field to a continuous recording layer 100 of the magnetic recording medium for measurement, as shown in FIG. 11, to magnetically form a recorded portion 104 along the peripheral direction of a track. The vicinity of the recorded portion 104 is in an alternating-current neutralization state. Then, a reproducing head 106 is brought near to the recorded portion 104 from a position enough away from the recorded portion 104 along the direction of the track width. Furthermore, passing over the recorded portion 104, the reproducing head 106 is moved to a position enough away from the recorded portion 104 on the opposite side. At this time, the relationship between the position of the reproducing head 106 in the direction of the track width with respect to the recorded portion 104 and the reproduction output of the reproducing head 106, as shown in FIG. 12, has a symmetrical shape with respect to the center of the recorded portion 104 in the direction of the track width. In FIG. 12, the distance (half-width) between the two points of the reproducing head 106 on both sides of the recorded portion 104 in the direction of the track width, at which a value of the reproduction output becomes a half of the maximum value of the reproduction output, is defined as the "magnetic write width MWw of the recording head 102." In the reproducing head 106 used in the measurement of the magnetic write width MWw, a magnetic read width MRw is smaller than the magnetic write width MWw to be measured. As long as the reproducing head 106 satisfies this condition, the reproducing head 106 may be either of the original reproducing head provided in the magnetic recording and reproducing device together with the recording head 102, and the reproducing head for the measurement.

Figure 13:
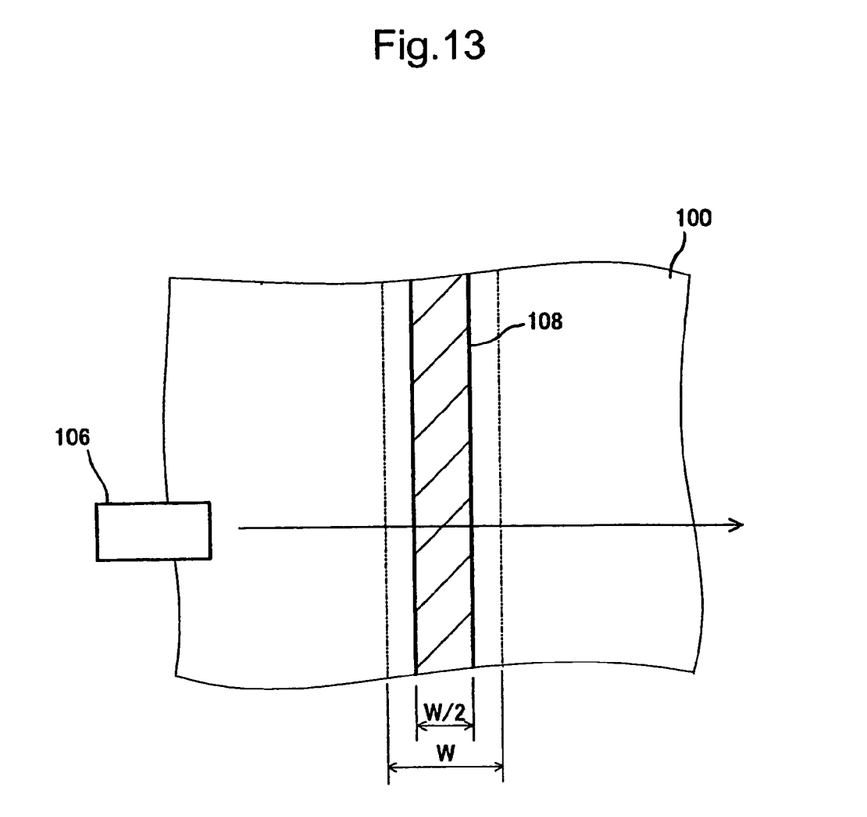
FIG. 13 is a plan view which shows a method for measuring the magnetic read width of the magnetic recording and reproducing device.
Figure 14:
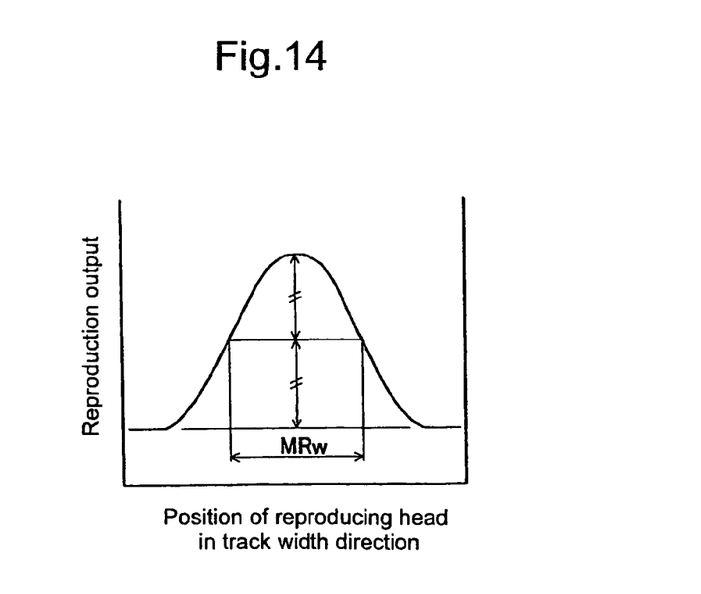
FIG. 14 is a graph showing the relationship between the position of a reproducing head in the direction of a track width and the output of a reproduction signal in the measurement of the magnetic read width.

The term "magnetic read width MRw of a reproducing head" is used herein to mean a value measured by the following method. Namely, the recording head 102 first applies a magnetic field to a magnetic recording medium for measurement having the same structure as above, to magnetically form tracks along the peripheral direction of the track. Then, both ends of the track in a width direction are subjected to alternating-current neutralization by an approximately quarter of a width W, so that a micro track 108 with a width of W/2, as shown in FIG. 13, is (magnetically) formed. Then, the reproducing head 106 is brought near to the micro track 108 from a position enough away from the micro track 108 along the width direction of micro track 108. Furthermore, passing over the micro track 108, the reproducing head 106 is moved to a position enough away from the micro track 108 on the opposite side. At this time, the relationship between the position of the reproducing head 106 in the width direction of the micro track 108 with respect to the micro track 108 and the reproduction output of the reproducing head 106 is as shown in FIG. 14. The distance (half-width) between the two points of the reproducing head 106 on both sides of the micro track 108 in the width direction thereof, at which a value of the reproduction output becomes a half of the maximum value of the reproduction output, is defined as the "magnetic read width MWw of the reproducing head 106".

The formula (III) described herein uses a unit of nm.

The term "magnetic recording medium" is used herein to mean a magnetic recording medium such as a floppy disc (registered trademark) and the like, in addition to a hard disc.

According to various exemplary embodiments of the present invention, it is possible to certainly write magnetic data on only a track to be written which is formed as a convex portion, and certainly read magnetic data from a track to be read.

BRIEF DESCRIPTION OF THE DRAWINGS

Various exemplary embodiments of the present invention will be described in detail with reference to the accompanying drawings, wherein.

DETAILED DESCRIPTION OF THE PREFERRED EMBODIMENT

Various exemplary embodiments of this invention will be hereinafter described in detail with reference to the drawings.

Figure 1:
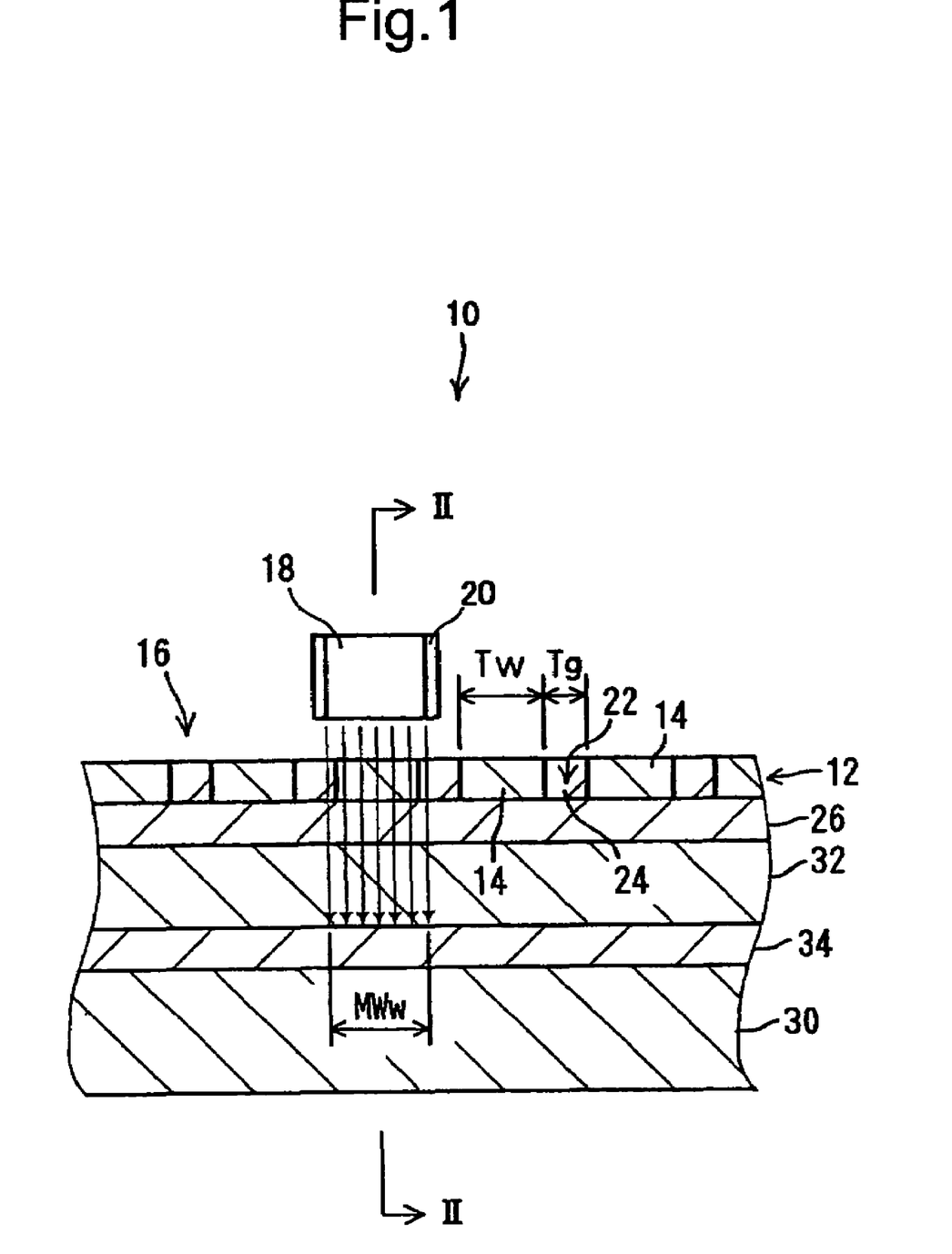
FIG. 1 is a schematic cross-sectional side view showing the structure of a magnetic recording and reproducing device according to a first exemplary embodiment of the present invention.
Figure 2:
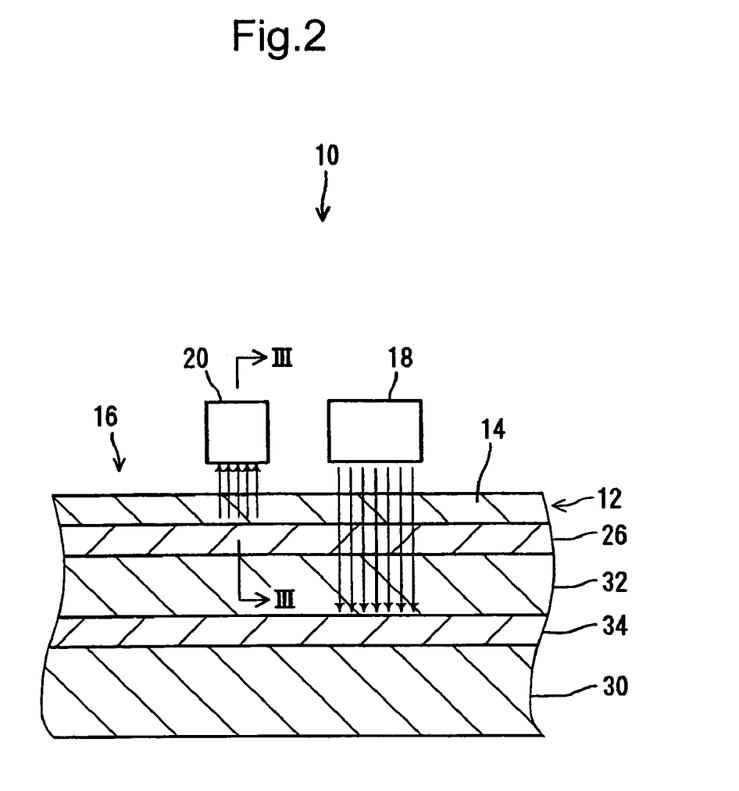
FIG. 2 is a cross-sectional side view taken along the line II—II of FIG. 1.
Figure 3:
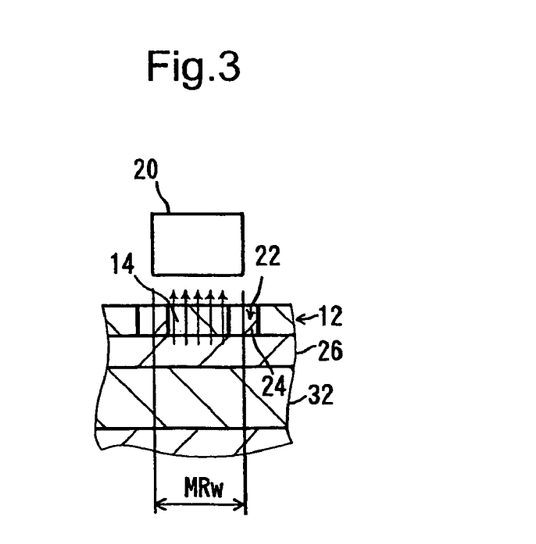
FIG. 3 is a cross-sectional side view taken along the line III—III of FIG. 2.

Referring to FIGS. 1 to 3, a magnetic recording and reproducing device 10 according to a first exemplary embodiment of the present invention comprises a magnetic recording medium 16, a recording head 18 for writing magnetic data on the magnetic recording medium 16, and a reproducing head 20 for reading magnetic data from a track 14. In the magnetic recording medium 16, a recording layer 12 is formed in a concavo-convex pattern, and convex portions of the concavo-convex pattern form the tracks 14, on which the magnetic data is recorded. The plurality of tracks 14 with a predetermined track width Tw are arranged at intervals of a predetermined track gap Tg in the direction of the track width Tw. The track width Tw and the track gap Tg of the magnetic recording medium 16, and the magnetic write width MWw of the recording head 18 satisfy the relationship represented by the following formula (I):

$$\{Tw+(2\times Tg)\}/1.2 \geq MWw \qquad (I)$$

FIG. 2 is a side cross-sectional view taken along the line II—II of FIG. 1. FIG. 3 is a side cross-sectional view taken along the line III—III of FIG. 2.

Moreover, in the magnetic recording and reproducing device 10, the track width Tw of the magnetic recording medium 16 and the magnetic write width MWw of the recording head 18 satisfy the relationship represented by the following formula (II):

$$1.2 \times Tw \leq MWw \qquad (II)$$

Furthermore, in the magnetic recording and reproducing device 10, the track width Tw and the track gap Tg of the magnetic recording medium 16, and the magnetic read width MRw of the reproducing head 20 satisfy the relationship represented by the following formula (III):

$$Tw \leq MRw \leq Tw+(2\times Tg)-50 \qquad (III)$$

The magnetic recording medium 16 is a perpendicular recording type of discrete track medium approximately in the shape of a disc. The tracks 14 are concentrically formed at minute intervals in a radial direction in a data region of the recording layer 12. A recording element (not illustrated) in a convex shape having a pattern of predetermined servo information and the like is formed in a servo region thereof.

The recording layer 12 is made of a CoCrPt (cobalt-chromium-platinum) alloy. The recording layer 12 is oriented so as to have magnetic anisotropy in a direction perpendicular to the surface of the magnetic recording medium 16.

Concave portions 22 between tracks 14 are filled with a non-magnetic material 24. Specific examples of the non-magnetic material 24 include, as a principal component, $SiO_2$ (silicon dioxide), Ti (titanium), $Al_2O_3$ (aluminum oxide), MgO (magnesium oxide), $TiO_2$ (titanium dioxide), and $ZrO_2$ (zirconium oxide).

A protection layer and a lubricating layer are formed in this order over the tracks 14 and the non-magnetic material 24 in practice. The illustration and description of these layers, however, are omitted because they seem to be unnecessary for understanding this exemplary embodiment.

The recording layer 12 is formed over a glass substrate 30. A seed layer 26, a soft magnetic layer 32, and an underlayer 34 are formed between the recording layer 12 and the glass substrate 30. The description of these layers, however, is also omitted because they seem to be unnecessary for understanding this exemplary embodiment.

The recording head 18 is disposed near the top face of the magnetic recording medium 16. The recording head 18 can apply a recording magnetic field to the tracks 14 in the direction perpendicular to the surface of the magnetic recording medium 16. The recording head 18 has the magnetic write width of a value of MWw in the relationship with the magnetic recording medium 16.

The reproducing head 20 is also disposed near the top face of the magnetic recording medium 16. The reproducing head 20 has the magnetic read width of a value of MRw in the relationship with the magnetic recording medium 16.

Then, the operation of the magnetic recording and reproducing device 10 will be described.

Operation in the case of writing magnetic data will be first described. In the magnetic recording and reproducing device 10, the magnetic write width MWw of the recording head 18 satisfies the relationship of the foregoing formula (I) with respect to the track width Tw and the track gap Tg of the magnetic recording medium 16. Therefore, it is restrained writing magnetic data wrongly on a track 14 adjacent to a track 14 to be written.

In the magnetic recording and reproducing device 10, the magnetic write width MWw of the recording head 18 satisfies the relationship of the foregoing formula (II) with respect to the track width Tw of the magnetic recording medium 16. Therefore, it is possible to write magnetic data on the magnetic recording medium 16 so as to obtain a sufficient S/N ratio of a reproduction signal.

Next, operation in the case of reproducing magnetic data will be described. In the magnetic recording and reproducing device 10, the magnetic read width MRw of the reproducing head 20 satisfies the relationship of the foregoing formula (III) with respect to the track width Tw and the track gap Tg of the magnetic recording medium 16. Therefore, it is restrained reading magnetic data wrongly from a track 14 adjacent to a track 14 to be read with sufficiently detecting a reproducing magnetic field of the track 14 to be read.

Namely, the magnetic recording and reproducing device 10 can certainly write the magnetic data on only the track 14 to be written, and certainly reproduce the magnetic data from the track 14 to be read. In other words, even if the track width Tw and the track gap Tg of the track 14 being a recording target region of magnetic data are minute, it is possible to certainly write and read the magnetic data. Therefore it is possible to satisfy both of high areal density, and fine recording and reproducing precision.

The recording layer 12 is a perpendicular recording layer, so that this respect also contributes to the realization of both of the high areal density, and the fine recording reproduction precision.

Next, a second exemplary embodiment of the present invention will be described.

Figure 4:
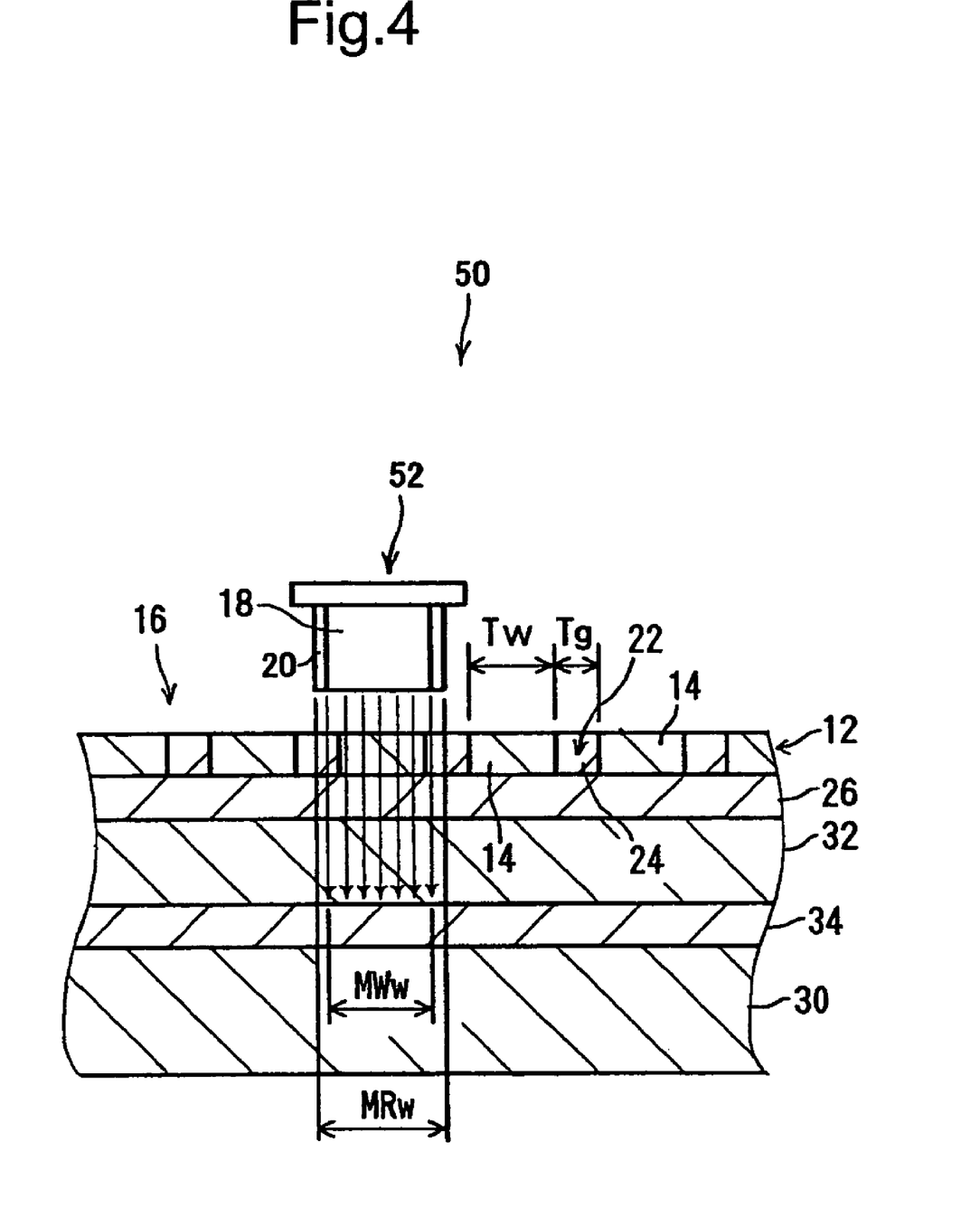
FIG. 4 is a schematic cross-sectional side view showing the structure of a magnetic recording and reproducing device according to a second exemplary embodiment of the present invention.

Referring to FIG. 4, in a magnetic recording and reproducing device 50 according to the second exemplary embodiment, a single magnetic head 52 is composed of a combination of a recording head 18 and a reproducing head 20, in comparison with the magnetic recording and reproducing device 10 according to the foregoing first exemplary embodiment. In the magnetic head 52, the magnetic read width MRw of the reproducing head 20 is larger than the magnetic write width MWw of the recording head 18. The other structure is the same as that of the magnetic recording and reproducing device 10 according to the first exemplary embodiment, so that the description thereof will be omitted.

The magnetic read width MRw of the reproducing head 20 is larger than the magnetic write width MWw of the recording head 18, as described above. Thus, it is possible to detect the reproducing magnetic field of a track 14 at the maximum, and therefore it is possible to obtain the favorable reproduction characteristics of magnetic data.

In the case of a conventional magnetic recording medium having a uniformly formed continuous recording layer, the magnetic read width MRw of a reproducing head has to be smaller than the magnetic write width MWw of a recording head, in order to prevent the wrong detection of a reproducing magnetic field of a track adjacent to a track to be read while the tracks being formed closer together to increase areal density. In the magnetic recording medium such as a discrete track medium and a patterned medium, however, the convex portions of the concavo-convex pattern of the recording layer form the tracks. Therefore, even if the magnetic read width MRw of the reproducing head is larger than the magnetic write width MWw of the recording head, it is possible to prevent the wrong detection of a reproducing magnetic field of a track adjacent to a track to be read. Also, it is possible to improve reproduction characteristics.

In other words, the magnetic head wherein the magnetic read width MRw of the reproducing head is larger than the magnetic write width MWw of the recording head, can realize both of the high areal density and the fine reproduction characteristics, by being used with the magnetic recording medium in which the convex portions of the concavo-convex pattern of the recording layer form the tracks.

According to the foregoing exemplary embodiments, specific examples of the non-magnetic material 24 include, as the principal component, $SiO_2$, Ti, $Al_2O_3$, MgO, $TiO_2$, or $ZrO_2$, but are not limited thereto as long as the material is a chemically stable non-magnetic material.

According to the foregoing exemplary embodiments, the concave portions 22 are filled with the non-magnetic material 24. If a stable head flying height can be secured with the concave portions 22 not filled with the non-magnetic material 24, the concave portions 22 may be vacant.

According to the foregoing exemplary embodiments, the seed layer 26, the soft magnetic layer 32, and the underlayer 34 are formed under the recording layer 12. The structure of layers under the recording layer 12 is properly changeable in accordance with the type of magnetic recording and reproducing device. For example, one or two layers of the underlayer 34, the soft magnetic layer 32, and the seed layer 26 may be omitted. Each layer may be composed of a plurality of layers. The recording layer 12 may be directly formed on the glass substrate 30.

According to the foregoing exemplary embodiments, the magnetic recording medium 16 is in a single-sided recording type, in which the recording layer 12 is formed on one side of the glass substrate 30. The present invention, however, is applicable to a double-sided recording type of magnetic recording medium, in which recording layers are formed on both sides of a glass substrate.

According to the foregoing exemplary embodiments, the magnetic recording medium 16 has the recording layer 12 of perpendicular recording type. The present invention, however, is applicable to a magnetic recording medium having a longitudinal recording layer. In this case, it is unnecessary to form the soft magnetic layer under the recording layer.

According to the foregoing exemplary embodiments, the recording layer 12 is made of the CoCrPt alloy. The present invention is applicable to a magnetic recording medium having a recording layer made of another material such as, for example, another alloy including an iron group element (for example, Co, Fe(iron), or Ni) and a layered product thereof.

According to the foregoing exemplary embodiments, the magnetic recording medium 16 is a discrete track medium, in which the tracks 14 are arranged in the radial direction in the data region. As a matter of course, the present invention is applicable to a magnetic recording and reproducing device having a patterned medium, in which tracks are arranged in both of a radial direction and a peripheral direction at minute intervals, a PERM type magnetic recording medium having a continuous recording layer of a concavo-convex pattern which continues even in convex portions, and a magnetic recording medium with tracks in a spiral shape.

SIMULATION EXAMPLE 1

In the case where the track width Tw and the magnetic write width MWw of the recording head are kept constant, and the track gap Tg is varied, the effect of the recording magnetic field of the recording head on a track adjacent to a track to be written was investigated. To be more specific, four types of simulation models with respective different track gaps Tg were produced as a first group. A plurality of tracks were arranged in parallel, and the track widths Tw of these simulation models were common. In each simulation model, the common recording head wrote magnetic data on the single track to be written with the magnetic write width MWw, and a common reproducing head read magnetic data from a track adjacent to the track to be written with a magnetic read width MRw. Magnetic data was not intentionally written on tracks other than the track to be written. The center of the track to be written in the direction of the track width was set to be aligned with that of the recording head. Also, the center of the track adjacent to the track to be written in the direction of the track width was set to be aligned with that of the reproducing head.

Other four types of simulation models with a different track width Tw, magnetic write width MWw, and magnetic read width MRw, and different track gaps Tg from those of the first group were produced as a second group.

Simulations were performed on the foregoing eight types of simulation models, in order to determine reproduction output from the track adjacent to the track to be written obtained by the reproducing head.

Figure 5:
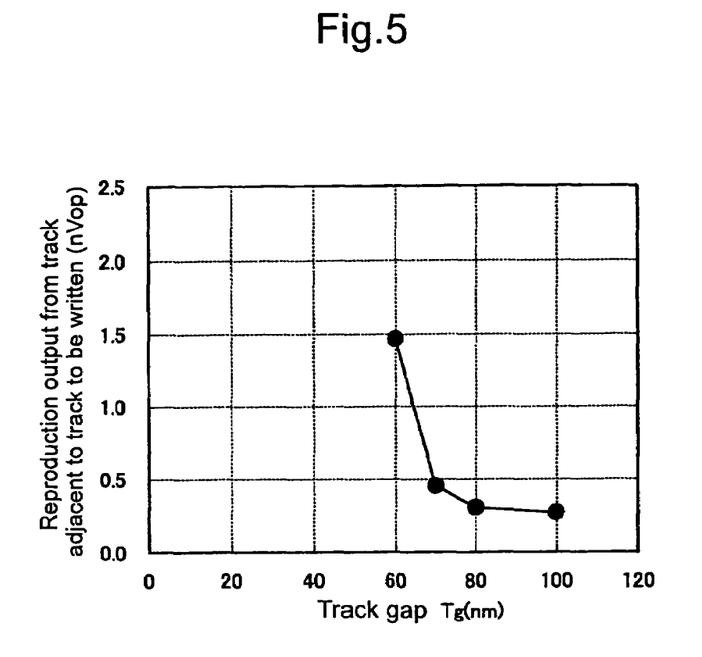
FIG. 5 is a graph showing the relationship between a track gap and reproduction output from a track adjacent to a track to be written related to simulation models in a first group according to a simulation example 1 of the present invention.
Figure 6:
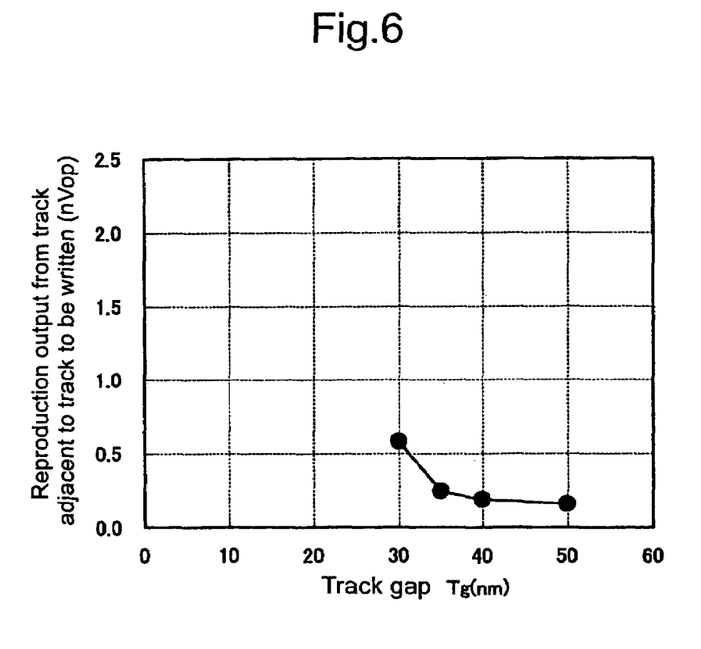
FIG. 6 is a graph showing the relationship between a track gap and reproduction output from a track adjacent to a track to be written related to simulation models in a second group according to the simulation example 1.

Table 1 shows the concrete structure and the reproduction output of the reproducing head of each simulation model.

the first group and the reproduction output of the track adjacent to the track to be written. FIG. 6 is a graph showing the relationship between the track gaps related to the four types of simulation models in the second group and the reproduction output of the track adjacent to the track to be written.

Referring to FIG. 5, according to the simulation of the first group, the reproduction output of the reproducing head significantly increases when the track gap Tg is smaller than 70 nm. This means that the recording head conspicuously writes the magnetic data even on the track adjacent to the track to be written. The magnetic data is conspicuously written even on the track adjacent to the track to be written, when an end of the magnetic write width MWw in the direction of the track width gets closer than 20 nm (MWw× 0.1) to the track adjacent to the track to be written, because the track gap Tg is 70 nm, the track width Tw is 100 nm, and the magnetic write width MWw is 200 nm.

In a like manner, according to the simulation of the second group shown in FIG. 6, the reproduction output of the reproducing head significantly increases when the track gap Tg is smaller than 35 nm. The magnetic data is conspicuously written even on the track adjacent to the track to be written, when an end of the magnetic write width MWw in the direction of the track width gets closer than 10 nm (MWw×0.1) to the track adjacent to the track to be written, because the track gap Tg is 35 nm, the track width Tw is 50 nm, and the magnetic write width MWw is 100 nm.

The distance between the end of the magnetic write width MWw in the direction of the track width and the track adjacent to the track to be written is represented by Tg−{ (MWw−Tw)/2}. If this value is MWw×0.1 or more, it is possible to restrain a phenomenon in which the magnetic data is written even on the track adjacent to the track to be written. Namely, it is desirable to satisfy the following formula.

$$Tg-(MWw-Tw)/2 \geq MWw \times 0.1$$

By transforming this formula, the foregoing formula (I) is obtained.

SIMULATION EXAMPLE 2

According to the simulation example 1, it is possible to determine an upper limit value of the magnetic write width MWw to restrain the phenomenon in which the magnetic data is written even on the track adjacent to the track to be written, in the relationship between the track width Tw and the track gap Tg. When the magnetic write width MWw is too small, the track to be written is not sufficiently magne-

TABLE 1

|  | First group | | | | Second group | | | |
| --- | --- | --- | --- | --- | --- | --- | --- | --- |
| Track width (nm) | 100 | | | | 50 | | | |
| Magnetic read width (nm) | 100 | | | | 50 | | | |
| Magnetic write width (nm) | 200 | | | | 100 | | | |
| Track gap (nm) | 100 | 80 | 70 | 60 | 50 | 40 | 35 | 30 |
| Reproduction output (nVop) | 0.27 | 0.30 | 0.45 | 1.47 | 0.16 | 0.19 | 0.25 | 0.58 |

FIG. 5 is a graph showing the relationship between the track gaps related to the four types of simulation models in tized to ends in the direction of the track width, and hence a sufficient S/N ratio of the reproduction signal cannot be obtained.

Accordingly, in the case where the track width Tw and the magnetic read width MRw of the reproducing head are kept constant, and the magnetic write width MWw of the recording head is varied, the effect of the reproduction signal outputted from the reproducing head on an S/N ratio was investigated. To be more specific, four types of simulation models with respective different magnetic write widths MWw were produced as a third group. In such simulation models, the track width Tw and the magnetic read width MRw of the reproducing head were common. The centers of the track, recording head, and reproducing head in the direction of the track width were set to be aligned.

Other four types of simulation models with a different track width Tw and magnetic read width MRw, and different magnetic write widths MWw from those of the third group were produced as a fourth group.

Simulations were performed on the foregoing eight types of simulation models, in order to determine the S/N ratio of the reproduction signal of a track.

Table 2 shows the concrete structure and the S/N ratio of the reproduction signal of each simulation model.

ends in the direction of the track width, and hence the sufficient S/N ratio of the reproduction signal is obtained.

SIMULATION EXAMPLE 3

When the magnetic read width MRw of the reproducing head is too small, the sufficient reproduction output cannot be obtained. When the magnetic read width MRw is too large, the magnetic data of the track adjacent to the track to be read is mistakenly read.

Accordingly, in the case where the track width Tw and the track gap Tg are kept constant and the magnetic read width MRw of the reproducing head is varied, the effect of the reproducing head on the reproduction output was investigated. To be more specific, twenty-six types of simulation models which read magnetic data from a track with four types of reproducing heads with respective different magnetic read widths MRw were produced as a fifth group. In such simulation models, a plurality of tracks were arranged in parallel. The track width Tw, the track gap Tg, and the magnetic write width MWw were common. In each simulation model, magnetic data was also written on a track (one track on one side) adjacent to a track to be read, and the reproducing head read magnetic data from the track to be

TABLE 2

|  | Third group | | | | Fourth group | | | |
| --- | --- | --- | --- | --- | --- | --- | --- | --- |
| Track width (nm) | 100 | | | | 50 | | | |
| Magnetic read width (nm) | 100 | | | | 50 | | | |
| Magnetic write width (nm) | 200 | 160 | 120 | 100 | 100 | 80 | 60 | 50 |
| S/N ratio (dB) | 26.3 | 25.0 | 23.3 | 18.0 | 20.8 | 19.6 | 17.7 | 12.4 |

Figure 7:
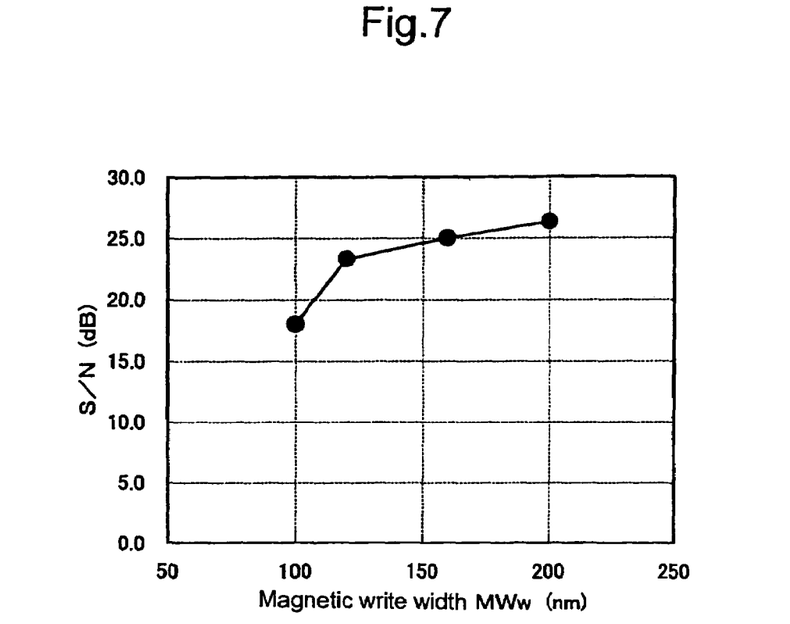
FIG. 7 is a graph showing the relationship between a magnetic write width MWw and an S/N ratio of a reproduction signal related to simulation models in a third group according to a simulation example 2 of the present invention.
Figure 8:
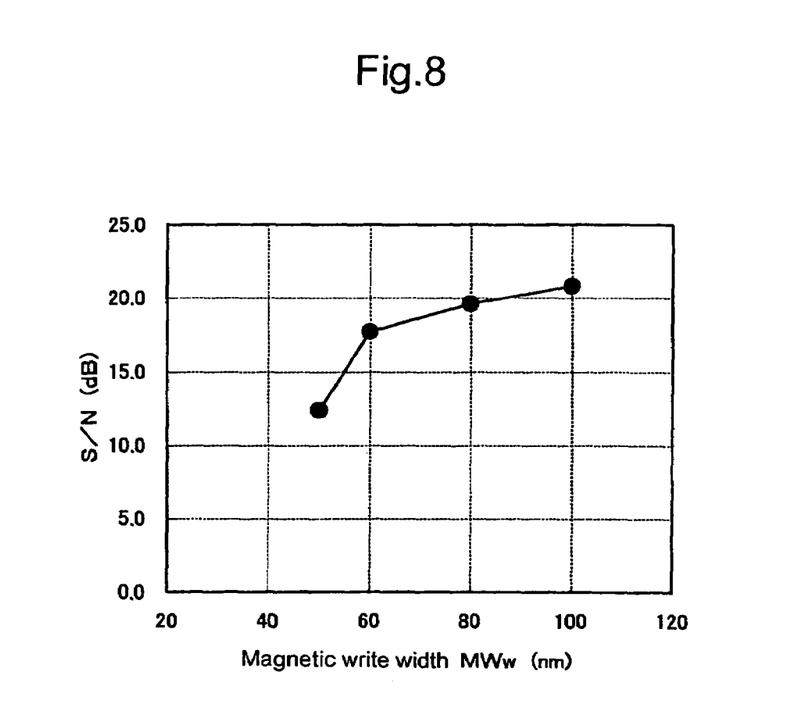
FIG. 8 is a graph showing the relationship between a magnetic write width MWw and an S/N ratio of a reproduction signal related to simulation models in a fourth group according to the simulation example 2.

FIG. 7 is a graph showing the relationship between the magnetic write width MWw and the S/N ratio of the reproduction signal, according to the four types of simulation models in the third group. FIG. 8 is a graph showing the relationship between the magnetic write width MWw and the S/N ratio of the reproduction signal, according to the four types of simulation models in the fourth group.

Referring to FIG. 7, according to the simulation of the third group, the S/N ratio of the reproduction signal significantly decreases when the magnetic write width MWw is smaller than 120 nm. This means that the track is not sufficiently magnetized to the ends in the direction of the track width. Since the magnetic write width MWw is 120 nm and the track width Tw is 100 nm, when the magnetic write width MWw is smaller than 1.2 times of the track width Tw of the track to be written, the track is not sufficiently magnetized to the ends in the direction of the track width. Therefore, the S/N ratio of the reproduction signal decreases.

In a like manner, according to the simulation of the fourth group shown in FIG. 8, the S/N ratio of the reproduction signal significantly decreases when the magnetic write width MWw is smaller than 60 nm. Since the magnetic write width MWw is 60 nm and the track width Tw is 50 nm, the track is not sufficiently magnetized to the ends in the direction of the track width, when the magnetic write width MWw is smaller than 1.2 times of the track width Tw of the track to be written, also in the fourth group. Therefore, it is found out that the S/N ratio of the reproduction signal decreases. In other words, when the foregoing formula (II) (1.2× Tw≦MWw) holds, the track is sufficiently magnetized to the read. The centers of the track to be read and the reproducing head in the direction of the track width were set to be aligned.

Other fourteen types of simulation models with a different track width Tw, track gap Tg, magnetic write width MWw, and different magnetic read widths MRw from those of the fifth group were produced as a sixth group.

Simulations were performed on the foregoing forty types of simulation models, in order to determine the reproduction output of the reproducing head.

Table 3 shows the concrete structure and the reproduction output of the reproducing head of each simulation model.

TABLE 3

| Magnetic read width MRw(nm) | Sixth group Tw = Tg = 50(nm) MWw = 100(nm) Reproduction output(nVop) | Fifth group Tw = Tg = 100(nm) MWw = 200(nm) Reproduction output(nVop) |
| --- | --- | --- |
| 25 | 6.30 | |
| 30 | 6.74 | |
| 40 | 7.46 | |
| 50 | 8.16 | 12.19 |
| 60 | 8.39 | 13.49 |
| 70 | 8.67 | 14.63 |
| 80 | 8.79 | 15.58 |
| 90 | 8.97 | 16.31 |
| 100 | 9.08 | 16.80 |
| 110 | 9.43 | 17.10 |
| 120 | 10.00 | 17.27 |
| 130 | 10.46 | 17.35 |
| 140 | 11.03 | 17.40 |
| 150 | 11.67 | 17.43 |
| 160 | | 17.45 |

TABLE 3-continued

| Magnetic read width MRw(nm) | Sixth group<br>Tw = Tg = 50(nm)<br>MWw = 100(nm)<br>Reproduction output(nVop) | Fifth group<br>Tw = Tg = 100(nm)<br>MWw = 200(nm)<br>Reproduction output(nVop) |
|---|---|---|
| 170 | | 17.47 |
| 180 | | 17.49 |
| 190 | | 17.53 |
| 200 | | 17.57 |
| 210 | | 17.62 |
| 220 | | 17.70 |
| 230 | | 17.80 |
| 240 | | 17.83 |
| 250 | | 17.91 |
| 260 | | 18.23 |
| 270 | | 18.64 |
| 280 | | 19.03 |
| 290 | | 19.52 |
| 300 | | 20.13 |

Figure 9:
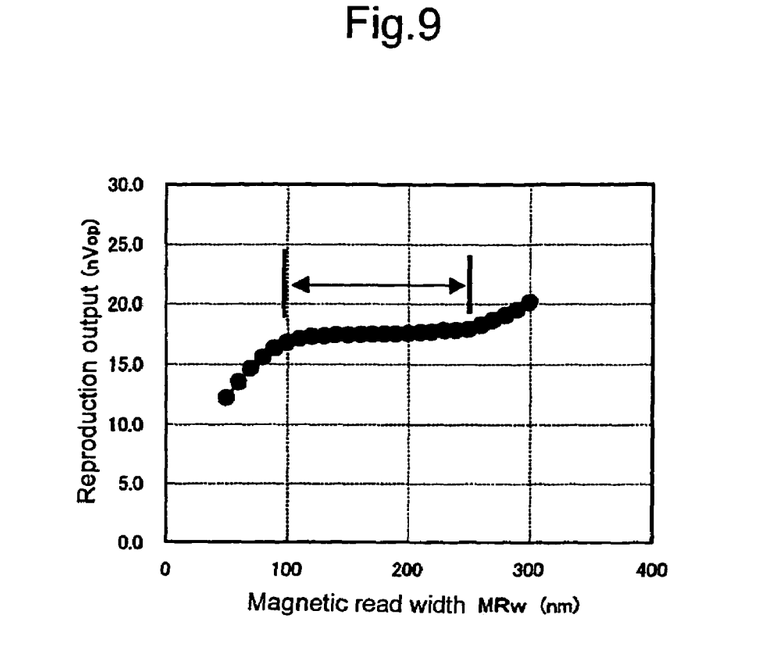
FIG. 9 is a graph showing the relationship between a magnetic read width MRw and the reproduction output of a reproducing head related to simulation models in a fifth group according to a simulation example 3 of the present invention.
Figure 10:
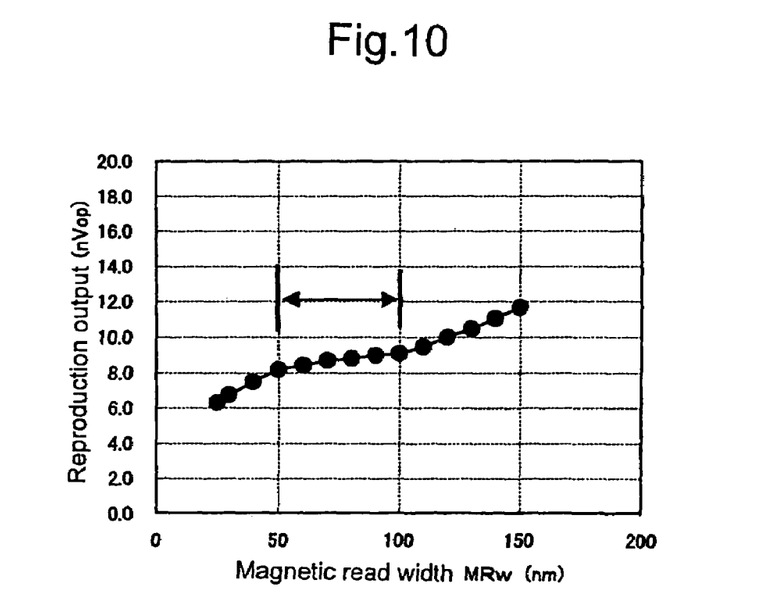
FIG. 10 is a graph showing the relationship between a magnetic read width MRw and the reproduction output of a reproducing head related to simulation models in a sixth group according to the simulation example 3.

FIG. 9 is a graph showing the relationship between the magnetic read width MRw and the reproduction output of the reproducing head, according to the twenty-six types of simulation models in the fifth group. FIG. 10 is a graph showing the relationship between the magnetic read width MRw and the reproduction output of the reproducing head, according to the fourteen types of simulation models in the sixth group.

Referring to FIG. 9, according to the simulations of the fifth group, the production output of the reproducing head decreases when the magnetic read width MRw is smaller than 100 nm (equal to the track width Tw). This means that the reproducing head does not sufficiently detect the reproducing magnetic field of the track. On the other hand, the reproduction output of the reproducing head increases when the magnetic read width MRw is larger than 250 nm. This means that the reproducing head detects the reproducing magnetic field of the track adjacent to the track to be read.

According to the simulations of the sixth group shown in FIG. 10, the reproduction output of the reproducing head decreases when the magnetic read width MRw is smaller than 50 nm (equal to the track width Tw). The reproduction output of the reproducing head increases when the magnetic read width MRw is larger than 100 nm.

Therefore, when the formula of Tw≦MRw holds, the reproducing head can sufficiently detect the reproducing magnetic field of the track to be read.

According to the simulations of the fifth group, when the magnetic read width MRw is 250 nm, the distance between an end of the magnetic read width MRw of the reproducing head and an end of the track adjacent to the track to be read is 25 nm. Furthermore, in the simulations of the sixth group, when the magnetic read width MRw is 100 nm, the distance between an end of the magnetic read width MRw of the reproducing head and an end of the track adjacent to the track to be read is also 25 nm. Thus, when the formula of MRw≦Tw+2×(Tg−25) holds, it is possible to prevent the reproducing head from reading the reproducing magnetic field of the track adjacent to the track to be read. By transforming this formula, the formula of MRw≦Tw+(2×Tg)−50 is obtained.

In other words, satisfying the relationship of the foregoing formula (III) makes it possible to obtain favorable reproduction characteristics.

The present invention is applicable to a magnetic recording medium in which a recording layer is formed in a concavo-convex pattern and convex portions of the concavo-convex pattern form tracks for recording magnetic data. The present invention is also applicable to a magnetic head for this magnetic recording medium, and a magnetic recording and reproducing device provided with the magnetic recording medium and the magnetic head.

What is claimed is:

1. A magnetic recording and reproducing device comprising:
    a magnetic recording medium having a recording layer formed in a concavo-convex pattern, convex portions of the concavo-convex pattern forming tracks with a predetermined track width for recording magnetic data, a plurality of the tracks being arranged in parallel at intervals of a predetermined track gap in a direction of the track width;
    a recording head for writing magnetic data on the magnetic recording medium; and
    a reproducing head for reading magnetic data from the magnetic recording medium, wherein
    a relationship represented by the following formula (I) is satisfied:

$$\{Tw+(2\times Tg)\}/1.2 \geq MWw \qquad (I)$$

wherein Tw represents the track width of the magnetic recording medium, Tg represents the track gap of the magnetic recording medium, and MWw represents a magnetic write width of the recording head.

2. The magnetic recording and reproducing device according to claim 1, wherein
    a relationship represented by the following formula (II) is satisfied:

$$1.2 \times Tw \leq MWw \qquad (II)$$

3. The magnetic recording and reproducing device according to claim 2, wherein
    a relationship represented by the following formula (III) is satisfied:

$$Tw \leq MRw \leq Tw+(2\times Tg)-50 \qquad (III)$$

wherein MRw represents a magnetic read width of the reproducing head.

4. The magnetic recording and reproducing device according to claim 2, wherein
    the recording layer of the magnetic recording medium is a perpendicular recording layer, and the perpendicular recording layer has magnetic anisotropy in a direction perpendicular to the surface of the magnetic recording medium.

5. The magnetic recording and reproducing device according to claim 2, wherein
    a magnetic read width of the reproducing head is larger than the magnetic write width of the recording head.

6. The magnetic recording and reproducing device according to claim 1, wherein
    a relationship represented by the following formula (III) is satisfied:

$$Tw \leq MRw \leq Tw+(2\times Tg)-50 \qquad (III)$$

wherein MRw represents a magnetic read width of the reproducing head.

7. The magnetic recording and reproducing device according to claim 6, wherein
    the recording layer of the magnetic recording medium is a perpendicular recording layer, and the perpendicular recording layer has magnetic anisotropy in a direction perpendicular to the surface of the magnetic recording medium.

8. The magnetic recording and reproducing device according to claim 6, wherein
the magnetic read width of the reproducing head is larger than the magnetic write width of the recording head.

9. The magnetic recording and reproducing device according to claim 1, wherein
the recording layer of the magnetic recording medium is a perpendicular recording layer, and the perpendicular recording layer has magnetic anisotropy in a direction perpendicular to the surface of the magnetic recording medium.

10. The magnetic recording and reproducing device according to claim 1, wherein
a magnetic read width of the reproducing head is larger than the magnetic write width of the recording head.

11. A magnetic recording medium provided in a magnetic recording and reproducing device, the magnetic recording and reproducing device having a recording head for writing magnetic data and a reproducing head for reading magnetic data, the magnetic recording medium comprising:
a recording layer formed in a concavo-convex pattern, convex portions of the concavo-convex pattern forming tracks with a predetermined track width for recording magnetic data, a plurality of the tracks being arranged in parallel at intervals of a predetermined track gap in a direction of the track width, wherein
a relationship represented by the following formula (I) is satisfied:

$$\{Tw+(2 \times Tg)\}/1.2 \geq MWw \tag{I}$$

wherein Tw represents the track width, Tg represents the track gap, and MWw represents a magnetic write width of the recording head.

12. The magnetic recording medium according to claim 11, wherein
a relationship represented by the following formula (II) is satisfied:

$$1.2 \times Tw \leq MWw \tag{II}$$

13. The magnetic recording medium according to claim 11, wherein
a relationship represented by the following formula (III) is satisfied:

$$Tw \leq MRw \leq Tw+(2 \times Tg)-50 \tag{III}$$

wherein MRw represents a magnetic read width of the reproducing head.

14. The magnetic recording medium according to claim 11, wherein
the recording layer is a perpendicular recording layer, and the perpendicular recording layer has magnetic anisotropy in a direction perpendicular to the surface of the magnetic recording medium.

15. A magnetic head provided in a magnetic recording and reproducing device having a magnetic recording medium, the magnetic recording medium having a recording layer formed in a concavo-convex pattern, convex portions of the concavo-convex pattern forming tracks with a predetermined track width for recording magnetic data, a plurality of the tracks being arranged in parallel at intervals of a predetermined track gap in a direction of the track width, the magnetic head comprising:
a recording head for writing magnetic data on the magnetic recording medium; and
a reproducing head for reading magnetic data from the magnetic recording medium, wherein
a relationship represented by the following formula (I) is satisfied:

$$\{Tw+(2 \times Tg)\}/1.2 \geq MWw \tag{I}$$

wherein Tw represents the track width of the magnetic recording medium, Tg represents the track gap of the magnetic recording medium, and MWw represents a magnetic write width of the recording head.

16. The magnetic head according to claim 15, wherein
a relationship represented by the following formula (II) is satisfied:

$$1.2 \times Tw \leq MWw \tag{II}$$

17. The magnetic head according to claim 15, wherein
a relationship represented by the following formula (III) is satisfied:

$$Tw \leq MRw \leq Tw+(2 \times Tg)-50 \tag{III}$$

where MRw represents a magnetic read width of the reproducing head.

18. The magnetic head according to claim 15, to be provided in the magnetic recording and reproducing device having the magnetic recording medium, the recording layer of the magnetic recording medium being a perpendicular recording layer, the perpendicular recording layer having magnetic anisotropy in a direction perpendicular to the surface of the magnetic recording medium.

19. The magnetic head according to claim 15, wherein
a magnetic read width of the reproducing head is larger than the magnetic write width of the recording head.

* * * * *